United States Patent
Wagner

(10) Patent No.: US 10,697,037 B2
(45) Date of Patent: Jun. 30, 2020

(54) INDUCTOR FOR AN INDUCTION HARDENING SYSTEM

(71) Applicant: Gerhard Wagner, Prichsenstadt (DE)

(72) Inventor: Gerhard Wagner, Prichsenstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 895 days.

(21) Appl. No.: 15/190,516

(22) Filed: Jun. 23, 2016

(65) Prior Publication Data

US 2016/0376678 A1 Dec. 29, 2016

(30) Foreign Application Priority Data

Jun. 26, 2015 (DE) .................. 10 2015 211 901

(51) Int. Cl.
| | |
|---|---|
| *C21D 9/40* | (2006.01) |
| *H05B 6/10* | (2006.01) |
| *H05B 6/40* | (2006.01) |
| *C21D 1/18* | (2006.01) |
| *C21D 1/42* | (2006.01) |
| *F16C 33/64* | (2006.01) |

(52) U.S. Cl.
CPC .................. *C21D 9/40* (2013.01); *C21D 1/18* (2013.01); *C21D 1/42* (2013.01); *F16C 33/64* (2013.01); *H05B 6/101* (2013.01); *H05B 6/40* (2013.01); *C21D 2211/001* (2013.01); *F16C 2223/18* (2013.01); *F16C 2300/14* (2013.01); *F16C 2360/31* (2013.01); *Y02P 10/253* (2015.11)

(58) Field of Classification Search
CPC ....................................................... C21D 1/42
See application file for complete search history.

(56) References Cited

U.S. PATENT DOCUMENTS

| | | | | |
|---|---|---|---|---|
| 4,490,411 A | * | 12/1984 | Feder | ....................... C23C 24/10 |
| | | | | 118/306 |
| 2011/0248023 A1 | * | 10/2011 | Doyon | ...................... C21D 1/10 |
| | | | | 219/632 |
| 2014/0223982 A1 | * | 8/2014 | Lee | ...................... B21D 22/022 |
| | | | | 72/38 |

FOREIGN PATENT DOCUMENTS

| | | |
|---|---|---|
| CN | 201292394 Y | 8/2009 |
| DE | 3609792 A1 | 9/1987 |
| DE | 102010002531 A1 | 9/2011 |
| DE | 102011110060 A1 | 2/2013 |
| DE | 102013101057 A1 | 8/2014 |
| EP | 1359230 B1 | 5/2008 |
| EP | 2801628 A2 | 11/2014 |
| EP | 2458023 B1 | 2/2016 |
| JP | H06200326 A | 7/1994 |
| JP | 2008215977 A | 9/2008 |
| WO | 2016006253 A1 | 1/2016 |

* cited by examiner

*Primary Examiner* — Scott R Kastler
(74) *Attorney, Agent, or Firm* — J-Tek Law PLLC; Scott T. Wakeman; Mark A. Ussai

(57) ABSTRACT

An inductor for an induction hardening system includes a heating element for heating a heating zone of a workpiece, and the heating element includes a first induction coil and a second induction coil and a gas escape device disposed between the first induction coil and the second induction coil. The gas escape device is configured to substantially prevent a liquid from a quenching device from reaching the heating zone while the heating zone is being heated by the first and second inductors.

18 Claims, 3 Drawing Sheets

INDUCTOR FOR AN INDUCTION HARDENING SYSTEM

CROSS-REFERENCE

This application claims priority to German patent application no. 10 2015 211 901.7 filed on Jun. 26, 2015, the contents of which are fully incorporated herein by reference.

TECHNOLOGICAL FIELD

The present disclosure is directed to an inductor for an induction hardening system as well as to an induction hardening system including an inductor and a method for induction hardening workpieces.

BACKGROUND

In order to harden the raceways of bearing rings, in particular of large rolling-element bearings, an induction hardening method is usually used these days. In this method, the raceways are heated by induction using an inductor and then quenched by a cooling liquid flowing from a quenching sprinkler. Here in particular with large bearing rings the raceway is selectively heated in the partial region of the inductor to a temperature above the austenitizing temperature and quickly cooled by the quenching sprinkler to a temperature below the martensite start temperature so that a transformation into an austenite structure occurs in an outer layer of the raceway, while in an internal region the initial microstructure remains. It can thereby be achieved that the raceway can be subjected to high mechanical stresses; simultaneously, however, it can be ensured by the non-austenitized internal region that the bearing ring retains its predetermined ductility and has sufficient stability with respect to crack formation.

In order to achieve this selective heating, inductors are used that are moved relative to the workpiece, in particular the bearing ring. Here either the inductor or the workpiece can be moved. Furthermore for an optimal result the inductors are adapted to the contour of the to-be-treated workpiece.

Here an inductor usually comprises an induction coil for heating the workpiece and a quenching sprinkler with which the heated region is quenched. As mentioned above a cooling liquid is used for this purpose, which quickly brings the temperature in the heated region from the austenitizing temperature to a temperature below the martensite start temperature, whereby the martensite transformation process is completed to the greatest possible extent. However, care must be taken that during operation of the inductor the liquid cooling medium does not reach the heating zone of the induction coil, since otherwise due to the temperature fluctuation caused by evaporation increased crack formation can occur or undesirable structural transformations can arise.

It has therefore been proposed, as described, for example, in DE 10 2010 002 531, to atomize the liquid cooling medium using a cooling gas to a cooling mist that instantly evaporates on the heated workpiece and thereby can no longer condense on the workpiece as a liquid.

However, it is disadvantageous in this prior art that the use of a cooling mist is not possible with inductors that are moved relative to the workpiece, since the cooling mist can also settle in an uncontrolled manner on the surfaces actually to be heated. The heating zone is thereby strongly cooled such that significantly more energy must be supplied to the inductors in order to reach the required temperature above the austenitizing temperature in the heating zone of the workpiece.

Alternatively it is also known to use a sealing-air (blocking-air) shower between induction coil and quenching sprinkler that should provide a sealing-air curtain that should ensure a limiting of cooling-liquid entry into the heating zone.

However, with the devices including sealing air it has been shown that the quenching sprinkler and the induction coil must be separated very far from each other so that the sealing air can develop a sufficient effect. Thus the time between heating and sudden cooling becomes too long for an optimal hardening process.

SUMMARY

An aspect of the present disclosure is therefore to provide an inductor that overcomes at least some of the above-mentioned disadvantages of the prior art.

An inductor for an induction hardening system is disclosed that includes a heating element for heating a to-be-hardened workpiece. The heating element includes a first and a second induction coil and a gas escape device between the induction coils, specifically, a cooling-gas escape device. The gas escape device helps ensure that the heating zone is kept free of cooling-liquid from a subsequently disposed quenching device. This occurs because, when it impinges on the to-be-treated workpiece, the gas is deflected from the surface of the workpiece, and a directed gas stream arises that keeps the cooling liquid away from the heating zone. It is to be noted in particular here that the gas outlet opening is not, as is known from the prior art, disposed in the quenching sprinkler, but actually in the heating zone of the induction coils. The quenching device can thereby be disposed in closer spatial proximity to the induction coils than in the prior art so that the time between heating and quenching is shortened and a better hardening result can be achieved.

On the other hand, due to the gas stream, the cooling in the region of the heating zone is not so extreme as with the use of a cooling mist also known from the prior art, the evaporative cooling of which cooling mist has such a large influence that a very strong cooling occurs in the region of the heating zone. Advantageously it has been shown that even a cooling of the workpiece in the region of the gas outlet opening to a temperature below the austenitizing temperature is tolerable. Only a temperature decrease below the martensite start temperature, such as during quenching, would negatively affect the energy balance and the structure formation.

As an advantageous embodiment shows, the gas outlet opening can even be configured as a cooling-gas escape device through which the cooling gas is guided to the workpiece. Since the gas escape device is disposed between the two induction coils, the gas stream escaping through the gas escape device impinges on the surfaces heated by the induction coil. It has been shown here that the gas deflection flow on the surface of the workpiece can be strengthened by additional thermodynamic components when using a cooling gas so that a particularly good gas stream can be achieved for keeping the to-be-heated surfaces free of the cooling liquid.

According to a further advantageous exemplary embodiment it is also advantageous for a particularly good and targeted application of the gas onto the surface of the workpiece if the gas escape device includes at least one gas nozzle through which the gas, in particular compressed air, is guidable onto the to-be-hardened workpiece. Due to this gas nozzle a very directed gas stream arises, which, when impinging on the surface of the workpiece, leads to a strong deflection stream that can reliably prevent a cooling liquid from entering into the heating zone.

According to a further advantageous exemplary embodiment the inductor comprises, subsequent to the second induction coil, a quenching device for quenching using a cooling liquid. Here in addition to the outlet openings for the cooling liquid, the quenching device can also have outlet openings for a cooling gas which provides a precooling of the workpiece before the actual quenching by the cooling liquid. An inductor can thereby be provided that integrates in one place all elements necessary for an induction hardening process. Since it is also ensured that no entry of the cooling liquid into the heating zone of the two induction coils takes place due to the gas escape device disposed between the first and second induction coil, it is possible to dispose the quenching device in the immediate vicinity of the two induction coils. The induction hardening method can thereby be accelerated overall, and the period of time between heating and quenching can be optimized such that an improved hardening of the workpiece can be achieved.

It is to be noted here in particular that the cooling effect of the gas stream that escapes from the gas escape device has no negative effect on the hardening process. Since, as a further preferred exemplary embodiment shows, a gas amount passing through the gas escape device is adjustable, the temperature decrease in the region of the gas outlet opening can be controlled and monitored. Here it is advantageous in particular if the gas amount is controlled such that a temperature decrease in the region of the gas outlet opening does not fall below a martensite start temperature. However, it has simultaneously been shown that a temperature decrease below the austenitizing temperature can be tolerated and has no negative influence on the hardening. The actual quenching to a temperature below the martensite start temperature is effected by the cooling liquid applied by the quenching device, since with a gas cooling the required very fast cooling to a temperature below the martensite start temperature cannot be achieved.

As gas, compressed air is preferably used, which generates a sufficiently large gas stream in order to prevent cooling liquid from the quenching device from entering into the heating zone.

Since such a device is usable in particular for hardening bearing rings, for example, for large rolling-element bearings, it is further advantageous if the inductor has a geometry that is configured as the negative contour of a bearing ring, in particular of a bearing ring including at least one flange. In principle, however, this device can also be used in the induction hardening of any other component.

If a bearing ring including a flange is hardened using the above-described inductor, it has been shown that it is particularly advantageous if the gas escape device is disposed in a region of the geometry that corresponds to the negative contour of the at least one flange. Here it has been shown that due to the flow deflection of the gas stream at the flange of the bearing ring the lateral flow-off along the surface of the bearing ring towards the quenching device can be increased so that a particularly reliable sealing effect against cooling liquid entry can be achieved.

A further aspect of the present disclosure relates to an induction hardening system including at least one, preferably movably disposed, above-described inductor.

A still further aspect of the present disclosure relates to a method for induction hardening a metallic workpiece using an above-described inductor or using an above-described induction hardening system. Such method includes: heating at least one partial region of the workpiece using the first induction coil and the second induction coil to a temperature T1 above an austenitizing temperature of the workpiece; quenching at least a partial region of the workpiece using a quenching liquid applied from a quenching device to a temperature T2 below a martensite start temperature; and preventing an entry of a quenching liquid in the to-be-heated partial region of the workpiece by applying a gas stream, in particular a compressed-air stream, using a gas escape device that is disposed between the first induction coil and the second induction coil.

This method advantageously makes it possible that on the one hand within the optimized time allowance the workpiece is brought to the austenitizing temperature or can be quenched to a temperature below the martensite temperature, whereby the hardening method can be optimized. As known the first and second induction coils serve for heating, while the quenching device ensures a sudden cooling and, depending on the material used, an ending to the greatest extent possible of the steel structure transformation. Simultaneously, however, an entry of the cooling liquid into the to-be-heated partial region of the workpiece can be prevented by providing the gas outlet opening. Since the gas escape device is disposed between the first and second induction oil, thanks to the sealing effect of the gas stream, the quenching liquid can be applied directly subsequent to the heating so that the quenching process can take place faster than with the inductors known from the prior art.

According to a further advantageous exemplary embodiment the method further comprises adjusting a gas amount introduced via the gas escape device such that a temperature decrease caused by applying the gas stream is above the martensite start temperature so that an actual quenching and a stopping of the transformation process is only achieved using the quenching device. Nevertheless a temperature decrease can be tolerated here in a range below the austenitizing temperature. Due to this tolerance it can be achieved that the maximum air flow can be applied to the workpiece, which ensures that a liquid entry into the to-be-heated partial region can be reliably prevented.

According to another advantageous exemplary embodiment, an inductor for an induction hardening system for heating a heating zone of a workpiece is provided, the inductor comprising: a first induction coil, a second induction coil adjacent to the first induction coil, a gas supply system including at least one gas nozzle between the first induction coil and the second induction coil and at least one quenching liquid nozzle adjacent to the second induction coil. The inductor may also include a plurality of outlet openings between the second induction coil and the at least one quenching liquid nozzle, the plurality of outlet openings being configured to direct a flow of cooling air against the workpiece at a location outside the heating zone. The inductor may be used in an induction hardening system, and the gas supply system may be configured to provide a quantity of gas to the at least one gas nozzle sufficient to substantially prevent a liquid from the liquid cooling nozzle from coming into contact with the heating zone when the heating zone is being heated by the first induction coil and the second induction coil. The induction hardening system may also include a controller for controlling the quantity of gas.

Further advantages and advantageous exemplary embodiments are depicted in the dependent claims, the description, and the drawings. Here a combination of the features in the description and in the drawings is purely exemplary, and it is clear to the person skilled in the art that the features need not necessarily be present in the specified combinations, but can also be present individually or combined in other ways, without the scope of the invention thereby being exceeded.

In the following, principles of the disclosure are described in more detail using the exemplary embodiment depicted in the drawings. The exemplary embodiments here are purely exemplary in nature and are not intended to define the scope of the invention. This applies in particular for features depicted in combination that can also be realized as stand-alone features in the context of the present invention. The scope of the application is defined solely by the appended claims.

DETAILED DESCRIPTION

In the following, identical or same-type elements are designated by the same reference numbers.

Figure 1:
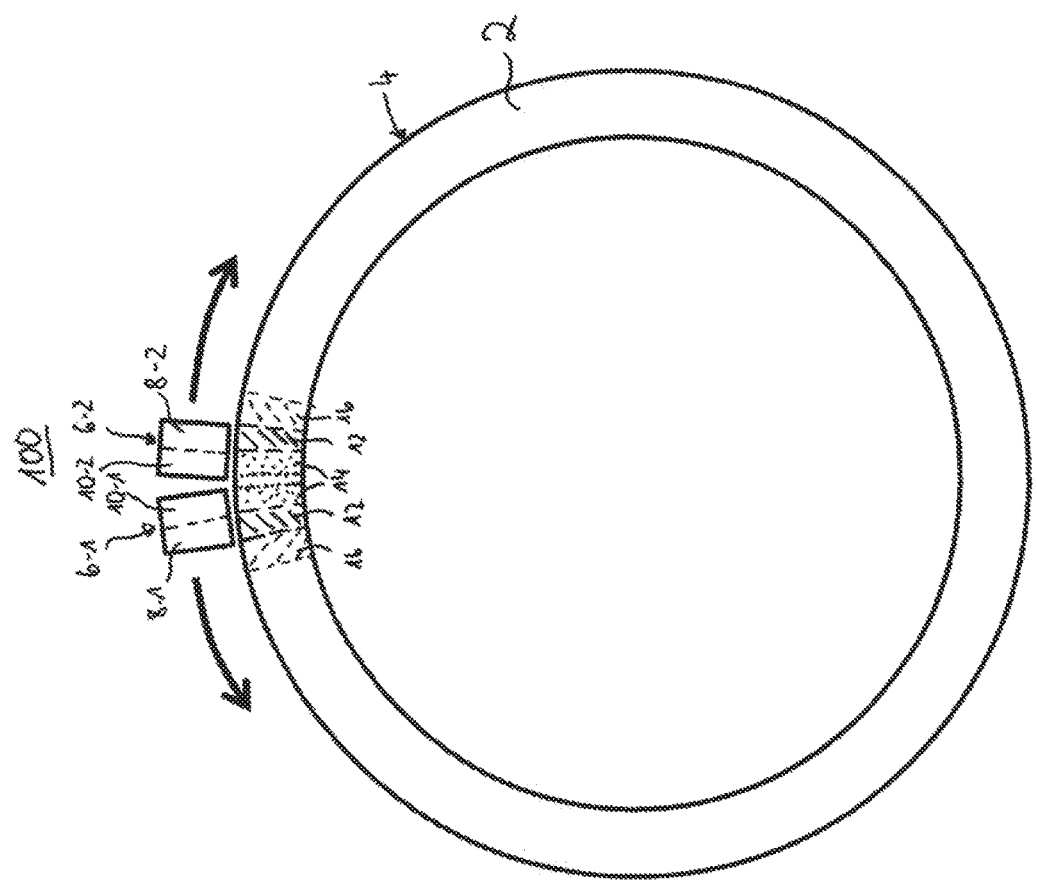
FIG. 1 shows a schematic view of an induction hardening system for bearing rings.

FIG. 1 schematically shows a plan view of an induction hardening system 100 for large bearing rings 2. With such an induction hardening system 100 the bearing ring 2 is usually horizontally disposed, wherein inductors 6-1, 6-2 are disposed on its raceway 4, which inductors 6-1, 6-2 travel along the bearing ring 2 (see arrows) in order to sequentially heat and subsequently quench the raceway 4. Here the inductors 6-1, 6-2 move along the circumference of the bearing ring 2 until they have reached a position approximately 180° away from their start position and thus the entire bearing ring 2 is hardened. Induction systems 100 of this type are known and can include, in addition to the inductors 6-1, 6-2 depicted here, further elements, such as, for example, further inductors 6 or further separate quenching sprinklers in order to carry out the hardening method. The inductors 6-1, 6-2 depicted in FIG. 1 comprise a heating element in order to bring the bearing ring 2 to a temperature above the austenitizing temperature in a partial region—in the heating zone 12—and a quenching device 10 subsequently disposed in the movement direction—indicated by the arrows—that quickly quenches the heated partial region—in the quenching zone 14—to a temperature below the martensite start temperature and thus stops the austenitizing process. The rolling-element-bearing steel of the bearing ring 2 in a surface region can thereby be transformed into an austenitic structure that ensures a high hardness, while in the rest of the bearing ring 2 the initial steel structure remains in order to maintain the desired ductility of the bearing ring 2. In FIG. 1 the heating zone 12 and the quenching zone 14 in the inductors are schematically drawn in. With moving of the inductors 6 in the direction of the arrows the heating element 8 heats the heating zone 12 to a temperature above the austenitizing temperature. With further moving of the inductors in the arrow direction the heating zone 12 escapes the influence of the heat element 8 and is quenched by the subsequently disposed quenching device 10 to a temperature below the martensite start temperature and thus transformed into the hardened quenching zone 14. At the same time the heating element 8 already heats the next partial region 16 on the bearing ring 2.

Figure 2:
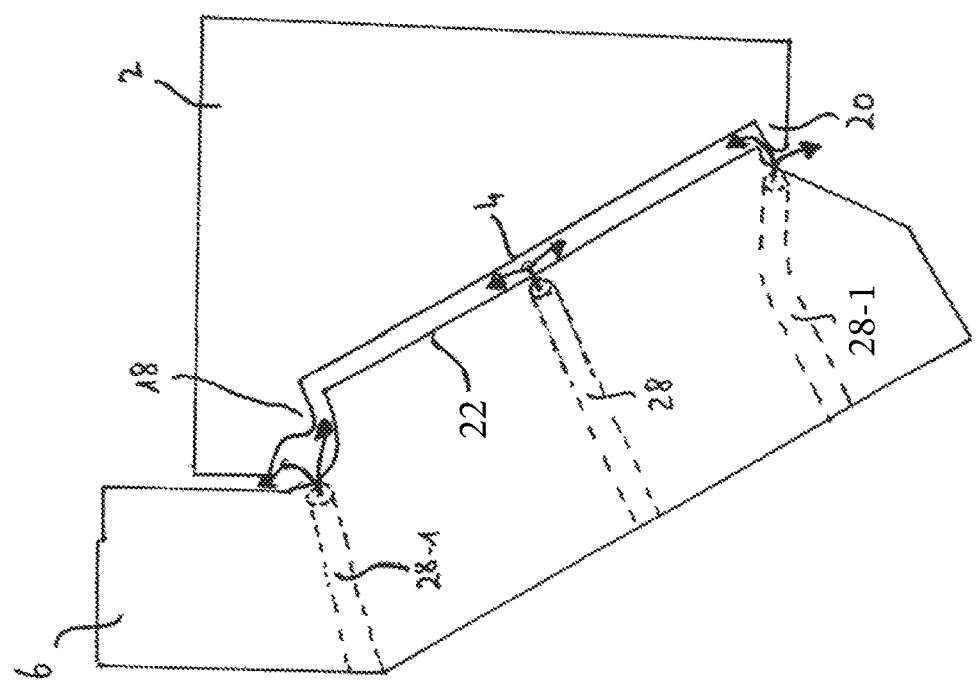
FIG. 2 shows a schematic view through an inductor that is disposed on a to-be-hardened bearing ring.

In order to achieve particularly good hardness results the inventive inductors 6 are configured in their contour as a negative contour of the to-be-hardened workpiece. Thus, for example, FIG. 2 schematically shows a sectional view though the bearing ring 2 and the inductor 6. As can be seen from the figure, the bearing ring 2 also includes on its raceway 4 flanges 18, 20 laterally delimiting the raceway 4. In order to imitate this contour of the bearing ring as closely as possible, the inductor therefore has a negative contour 22 corresponding to the shape of raceway 4 and flanges 18, 20 so that the inductor 6 can be disposed as close as possible to the ring over the entire contour of the bearing ring 2.

A widespread problem with the usual inductors is that the quenching device is usually operated using a cooling liquid, which, however, should to the extent possible not enter into the region of the heating element 8 in order to prevent nonuniform temperatures, caused by the evaporative cooling of the cooling liquid, in the heating zone 12. However, since the quenching device 10 and the heating zone 12, as can also be seen from FIG. 1, are usually spatially disposed very close to each other, a preventing of the cooling liquid ingress into the heating zone 12 is only prevented with great difficulty in the known inductors.

Figure 3:
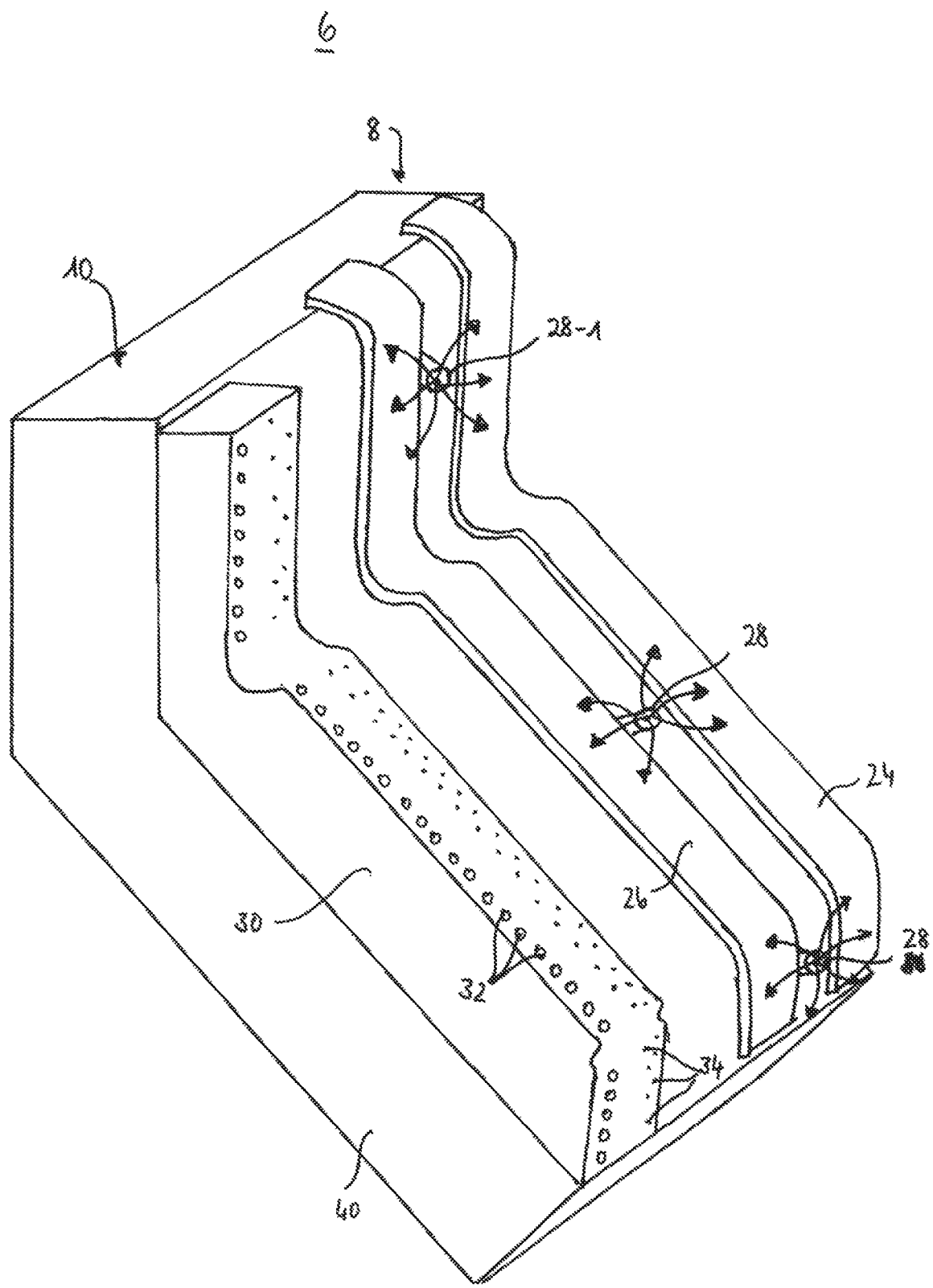
FIG. 3 shows a schematic depiction of a preferred exemplary embodiment of an inductor used in the induction hardening system depicted in FIG. 1 in perspective view.

The inventive inductor 6 therefore includes, as can be seen in FIG. 3, a two-part heating element 8 that includes a first induction coil 24 and a second induction coil 26. Gas outlet openings 28 are in turn provided between the first induction coil 24 and the second induction coil 26. Using these gas outlet openings gas can flow onto the surface of the bearing ring 2, is deflected by it and thus forms a strong gas stream (see arrows in FIG. 2 and FIG. 3) keeping the heating zone 12 clear. Furthermore the spatial perspective view of FIG. 3 shows that the heating element 8 is supported in the shape of the induction coils 24, 26 by a support construction 40 on which the quenching device 10 is also disposed. For the sake of simplicity the supply cables and hoses for the induction coils 24, 26 and the quenching device 10 are not depicted.

Furthermore FIG. 3 shows that the quenching device 10 is configured two-part and includes a quenching sprinkler 30 with cooling liquid nozzles 32, using which the cooling liquid for quenching can be applied to the bearing ring 2. Furthermore the quenching device 10 comprises air escape nozzles 34 that serve for a precooling of the heating zone 12 on the bearing ring 2 before the heating zone 12 is cooled to a temperature below the martensite start temperature. This gas stream is not sufficient to reliably prevent cooling liquid from entering into the heating zone 12. In contrast, the disclosed gas outlet openings 28 that are disposed between the first induction coil 24 and the second induction coil 26 make it possible, as can be seen in FIGS. 2 and 3, that gas that flows out from the gas outlet openings 28 flows off laterally along the bearing ring 2, in particular the raceway 4 of the bearing ring 2 and is deflected both in the axial direction, as depicted by the arrows in FIG. 2, and in the circumferential direction, as depicted by the arrows in FIG. 3. Due to the thus-arising gas flow the cooling liquid is reliably prevented from entering into the heating zone 8.

Furthermore it has been shown that with the use of relatively cool gas flowing out from the gas outlet openings 28, due to the thermals arising with the impinging on the heated surface, the flowing-off- and thus the sealing-effect of the gas with respect to the cooling liquid can increase further. It has been shown here in particular that with the temperature decrease in the heating zone 12 of the bearing ring 2, which temperature decrease is accompanying the outflow of the gas between the induction coils 24, 26, a temperature decrease to a temperature below the austenitizing temperature is tolerable without problems. It is merely advantageous if the cooling due to the gas escape from the gas outlet openings 28 does not occur until a temperature below the martensite start temperature and thus the hardening process is completely interrupted.

A further advantage of the gas outlet opening 28 disposed between the first and second induction coil 24, 26 is that due to the thus reliable sealing effect of the gas flow, the quenching device can be brought closer spatially to the heating element 8 so that the inductor 6 can be configured smaller overall.

The arrangement of the gas outlet openings 28 can be different to the arrangements depicted in FIG. 3. Thus, for example, the gas outlet opening 28 can also be disposed in the region next to a flange 18 of the bearing ring is intended to be located, as depicted, for example, in FIG. 2. Such an arrangement brings about a particularly good sealing effect, since the incident flow onto the flange can lead to advantageous flow-speeds and -directions.

Furthermore, for a controlling of the temperature decrease in the heating zone 12, due to the gas outlet openings 28 it is possible to precisely adjust the amount of gas that flows through the gas outlet openings 28. The devices required for this purpose are not depicted. The use of compressed air, which can be simply provided and the gas amount of which can be simply adjusted, is particularly preferred for the outflow gas. In addition, no further protective measures such as extractor hoods or closed spaces are necessary.

Overall using the proposed inductor an induction hardening system and an induction hardening process can be provided, using which a cooling liquid entry into the heating zone 12 can be reliably prevented. Heating asymmetries due to evaporative-cooling-related points on the to-be-hardened workpiece can thereby be avoided. It is further noted that the above-described method is usable not only for the bearing rings depicted, but also for other workpieces.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved inductors.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Induction hardening system
2 Bearing ring
4, 6 Inductor
8 Heating zone
10 Quenching zone
12, 14 Heated or to-be-heated partial region on the bearing ring
16 Raceway of the bearing ring
18, 20 Flange
22 Negative contour of the inductor
24 First induction coil
26 Second induction coil
28 Gas outlet openings
30 Quenching sprinkler
32 Cooling liquid nozzles
34 Cooling-gas-flow nozzles
40 Support

What is claimed is:

1. An inductor for an induction hardening system, the inductor being configured to move along a workpiece in a circumferential direction, the inductor comprising:
a unitary support body having a first side configured to oppose the workpiece,
a first induction coil on the first side of the support body and a second induction coil on the first side of the support body adjacent to the first induction coil and spaced from the first induction coil in the circumferential direction by a first gap and at least one gas discharge opening formed in the first side of the support body between the first induction coil and the second induction coil.

2. The inductor according to claim 1, wherein the gas discharge opening includes a gas nozzle for directing compressed air against the workpiece.

3. The inductor according to claim 2, further including a quenching device on the unitary support body adjacent to the second induction coil and circumferentially spaced from the second induction coil.

4. The inductor according to claim 3, wherein the quenching device comprises a quenching sprinkler including a first plurality of outlet openings configured to direct a cooling liquid against the workpiece.

5. The inductor according to claim 4, wherein the quenching sprinkler further includes a second plurality of outlet openings configured to direct a compressed gas against the workpiece.

6. The inductor according to claim 1, wherein a gas amount passing through the gas escape device is adjustable.

7. The inductor according to claim 1, wherein the workpiece comprises a bearing ring having at least one flange and wherein the inductor is configured as a negative contour of the bearing ring.

8. The inductor according to claim 7, wherein the at least one gas discharge opening comprises at least one nozzle located at a portion of the inductor corresponding to the at least one flange.

9. An induction hardening system including at least one inductor according to claim 1.

10. The inductor according to claim 1, further including a quenching device disposed integrally on the inductor adjacent to the second induction coil, the quenching device comprising a quenching sprinkler including a first plurality of outlet openings configured to direct a cooling liquid against the workpiece, the quenching sprinkler further including a second plurality of outlet openings configured to direct a compressed gas against the workpiece, wherein the at least one gas discharge opening comprises at least one gas nozzle for directing compressed air against the workpiece and wherein a gas amount passing through the at least one gas discharge opening is adjustable, wherein the workpiece comprises a bearing ring having at least one flange and wherein the inductor is configured as a negative contour of the bearing ring and wherein at least one nozzle is located at a portion of the inductor corresponding to the at least one flange.

11. An inductor for an induction hardening system for heating a heating zone of a workpiece, the inductor comprising:

a first induction coil;

a second induction coil adjacent to the first induction coil;

a gas supply system including at least one gas nozzle between the first induction coil and the second induction coil; and at least one quenching liquid nozzle adjacent to the second induction coil.

12. The inductor according to claim 11, further including a plurality of outlet openings between the second induction coil and the at least one quenching liquid nozzle, the plurality of outlet openings being configured to direct a flow of cooling air against the workpiece at a location outside the heating zone.

13. An induction hardening system comprising:

at least one inductor according to claim 11, wherein the heating zone is a zone of the workpiece directly opposite the first induction coil and the second induction coil, and wherein the gas supply system is configured to provide a quantity of gas to the at least one gas nozzle sufficient to substantially prevent a liquid from the liquid cooling nozzle from coming into contact with the heating zone when the heating zone is being heated by the first induction coil and the second induction coil.

14. An induction hardening system according to claim 13 including a controller for controlling the quantity of gas.

15. The inductor according to claim 11, including a unitary support body having a first side configured to oppose a surface of the workpiece, wherein the first induction coil, the second induction coil, the at least one gas nozzle and the at least one quenching liquid nozzle are mounted on the unitary support body.

16. The inductor according to claim 15, wherein the first induction coil and the second induction coil each comprise an elongated strip extending in a direction, the first induction coil being spaced from the second induction coil in a second direction perpendicular to the first direction by a gap, and wherein the at least one gas nozzle comprises a plurality of gas nozzles in the gap, and wherein the quenching device comprises a elongated spray head extending in the direction.

17. The induction hardening head according to claim 3, wherein the first induction coil and the second induction coil each comprise an elongated strip extending in a direction perpendicular to the circumferential direction, and wherein the at least one gas nozzle comprises a plurality of gas nozzles in the first gap.

18. The induction hardening head according to claim 17, wherein the quenching device comprises an elongated spray head extending in the direction perpendicular to the circumferential direction.

\* \* \* \* \*